J. WILSON.
APPARATUS FOR FORMING BENCHES FOR GREENHOUSES.
APPLICATION FILED JULY 19, 1907.

1,065,417.

Patented June 24, 1913.

4 SHEETS—SHEET 1.

Witnesses:
Jas. F. Coleman
John F. Fotsch

Inventor
John Wilson
By Dyer & Dyer
Attorneys.

J. WILSON.
APPARATUS FOR FORMING BENCHES FOR GREENHOUSES.
APPLICATION FILED JULY 19, 1907.
1,065,417.
Patented June 24, 1913.
4 SHEETS—SHEET 2.
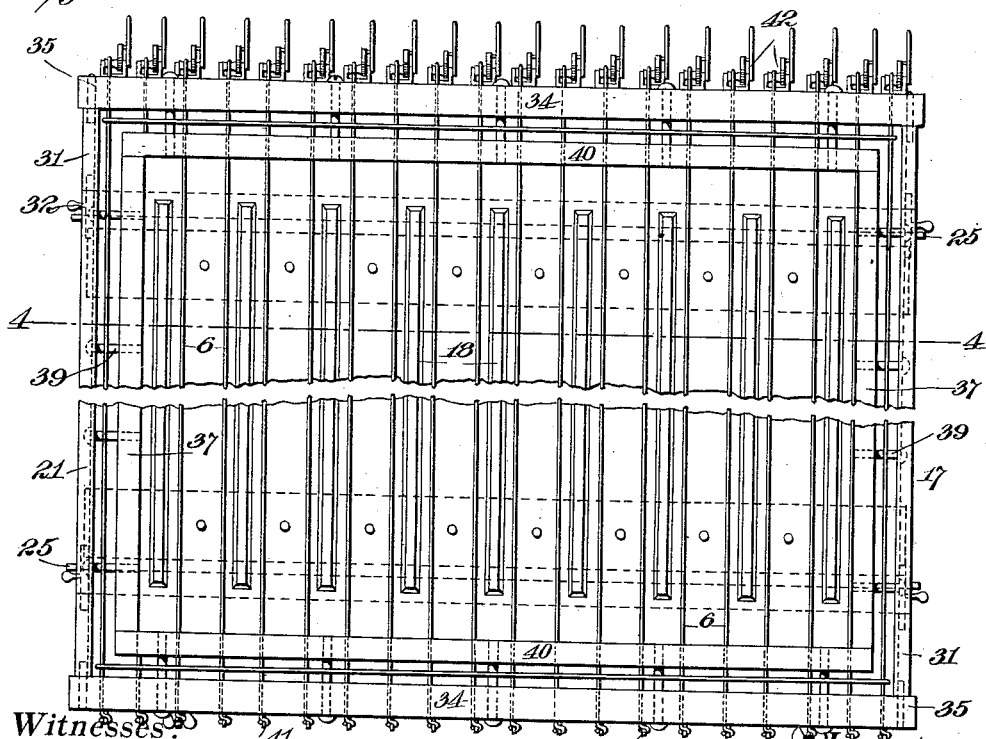

J. WILSON.
APPARATUS FOR FORMING BENCHES FOR GREENHOUSES.
APPLICATION FILED JULY 19, 1907.
1,065,417.
Patented June 24, 1913.
4 SHEETS—SHEET 3.
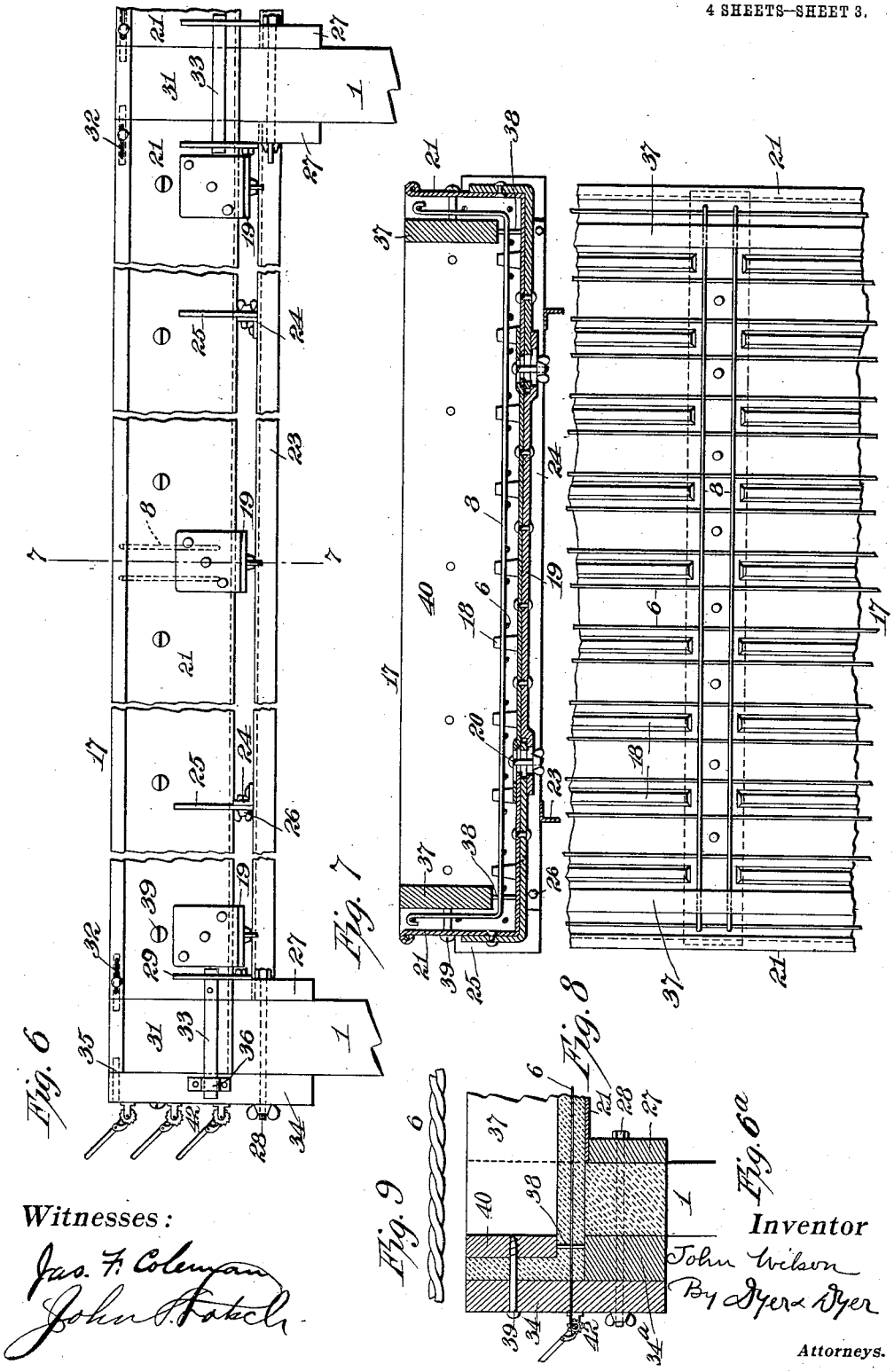
Witnesses:
Jas. F. Coleman
John S. Fotch
Inventor
John Wilson
By Dyer & Dyer
Attorneys.

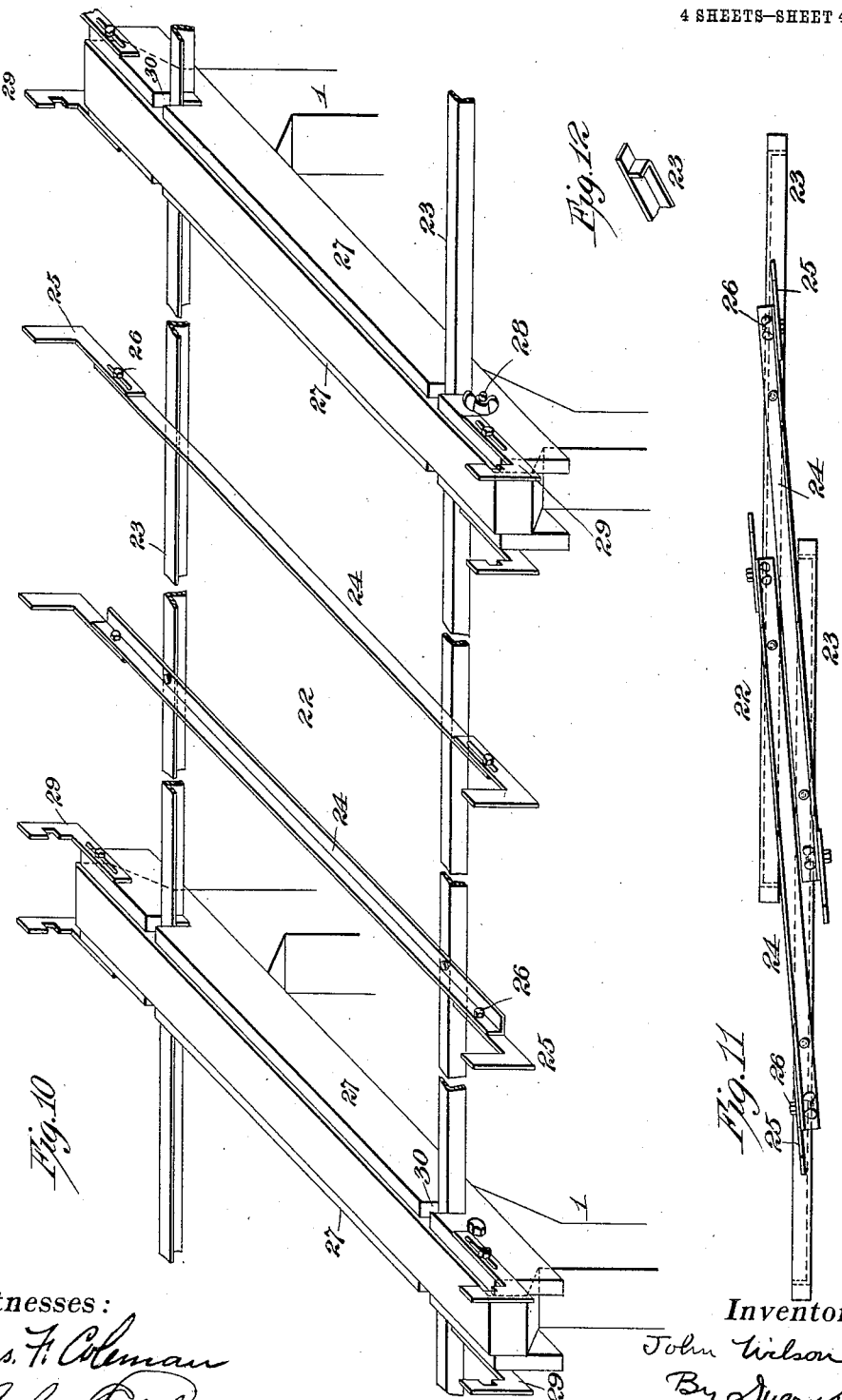

UNITED STATES PATENT OFFICE.

JOHN WILSON, OF SHORT HILLS, NEW JERSEY, ASSIGNOR, BY DIRECT AND MESNE ASSIGNMENTS, TO WILSON-HOYT COMPANY, OF SHORT HILLS, NEW JERSEY, A CORPORATION OF NEW JERSEY.

APPARATUS FOR FORMING BENCHES FOR GREENHOUSES.

1,065,417. Specification of Letters Patent. Patented June 24, 1913.

Application filed July 19, 1907. Serial No. 384,635.

*To all whom it may concern:*

Be it known that I, JOHN WILSON, a citizen of the United States, and a resident of Short Hills, county of Essex, and State of New Jersey, have invented an Apparatus for Forming Benches for Greenhouses, of which the following is a specification.

The object I have in view is the production of a means for making monolithic benches of reinforced concrete, which apparatus will make the operation of building benches a simple and expeditious one.

By my invention I produce an apparatus which may be readily transported, which may be adjusted to form benches of different sizes, and which may be assembled to build a bench within the greenhouse or other place where it is to be used.

Other advantages will more fully appear in the following specification and the drawings forming a part of this specification, either taken together or separately.

Figure 1:
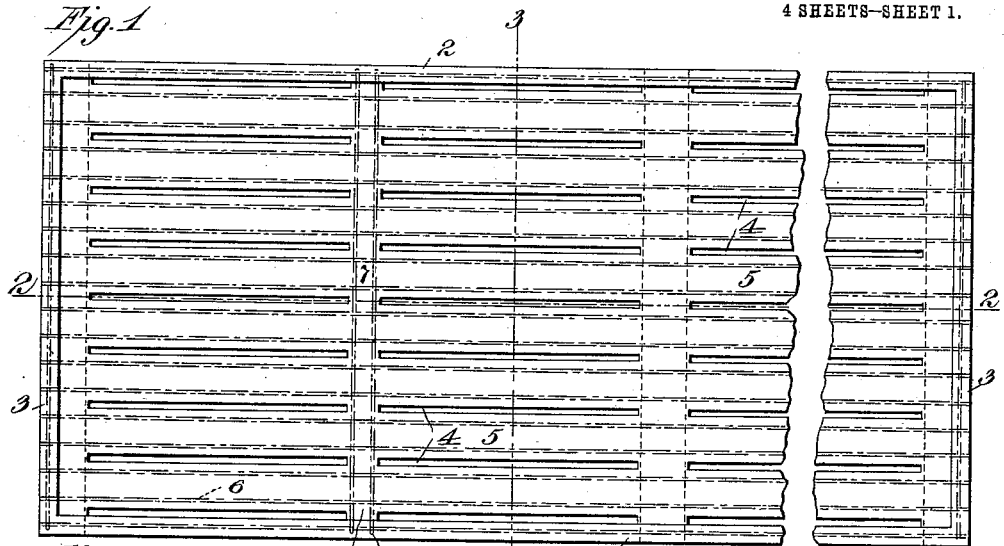
Figure 2:
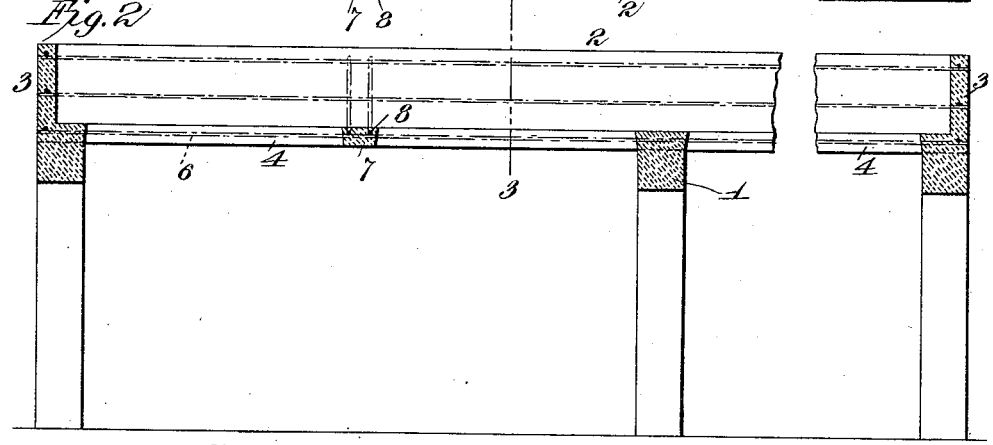
Figure 3:
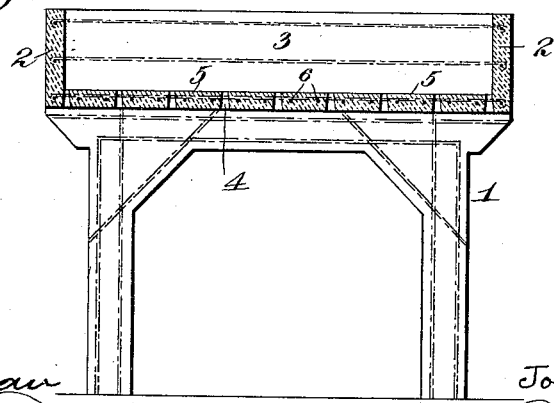

In these drawings, Figure 1 is a plan view, with a portion broken away, of a bench embodying my invention. Fig. 2 is a longitudinal section of the same taken on the line 2—2 of Fig. 1. Fig. 3 is a transverse section taken on the line 3—3 of Fig. 1. Fig. 4 is a transverse section of a mold taken on the line 4—4 of Fig. 5. Fig. 5 is a plan view of the same, the parts being broken away to show both ends of a mold. Fig. 6 is a side view of the mold with parts broken away. Fig. 6ª is a detail section of a modification. Fig. 7 is a cross section taken on the line 7—7 of Fig. 6. Fig. 8 is a plan view of a portion of the device shown in Figs. 6 and 7. Fig. 9 is a detail view of the preferred form of the reinforcing wire. Fig. 10 is a perspective view of two bents in position, and the mold support arranged between the same, the mold being absent. Fig. 11 is a plan view of the mold support in its folded position; and Fig. 12 is a detail view of one end of the mold supporting members.

In all of the views like parts are designated by the same reference characters.

In Figs. 1, 2 and 3, is shown the bench. It is formed with integral bents 1, which are preferably of reinforced concrete, and has a longitudinally slotted top with vertical sides 2 and ends 3. The sides and ends may be omitted in certain situations if considered desirable.

The longitudinal slots 4 in the top of the bench form between them longitudinal slabs or slats 5. These slats are reinforced by longitudinal wires or other metallic members 6, which extend from end to end of each bench. The benches are made of any length desired and may in practice exceed several hundred feet. The bents are arranged at intervals a convenient distance apart, preferably a distance slightly greater than the width of the bench.

Between each pair of bents the slots 4 are preferably interrupted one or more times in order to form transverse slats 7. These transverse slats are preferably reinforced by wires or other metallic members 8; the sides 2 and ends 3 are preferably also reinforced by wires, similar to the wires 6, and the transverse wires 8 preferably extend upward into the sides. The entire bench is therefore formed of monolithic reinforced concrete, the top being smooth, and provided with longitudinal slots, which permit the escape of moisture from the soil. The tops, sides and ends of the benches are reinforced. By this construction the sides, ends and tops may be made of a minimum thickness with a resulting economy in manufacture.

The slots 4 are best made parallel, as by that construction they may be more readily manufactured, as will hereinafter appear.

The benches are preferably made from bents of certain stock sizes which are arranged at proper intervals, and the tops with the sides and ends, where the latter are used, are molded in place upon the bents, and combine therewith and form an integral structure, the entire operation taking place within the greenhouse or other place where the bench is to be used.

The means for molding the benches comprises a mold having a ribbed bottom, the ribs running longitudinally and having tapered sides, and ends which ribs form the longitudinal slats and the slots between them. The ribs are of a height equal to the thickness of the bench top, so that they form gages to determine the thickness of the cement, and, when the mold is withdrawn, the spaces occupied by the ribs will form the slots. This mold is arranged in sections, each section being adapted to be placed between contiguous bents. It is supported upon a frame, which is temporarily secured to the bents. Means is attached to the mold to form a proper configuration of the sides and ends, and other means is attached for supporting and stretching the wires.

The concrete is molded within the mold and around the wires, and the supporting frame is removed, permitting the mold to drop downward. This leaves the completely finished bench, with its monolithic top and its sides and ends all properly reinforced by the longitudinal and transverse wires. The mold 17 is of such a length that it will extend between two contiguous bents. It is preferably made of sheet iron, or other suitable material, and is provided with longitudinal parallel ribs 18, such ribs as shown in Fig. 4 having tapering side walls and ends so that they are wider at the bottom than at the top. Their depth is preferably the same as the thickness of the finished bench top.

The spaces between the ribs define the width and depth of the longitudinal slats 5. The thickness of each rib defines the width and shape of the slots 4. By having tapering side walls the mold may be removed from below when relieved of its support. Each mold is best made of a plurality of pieces, three being shown in Figs. 4 and 7, the pieces being so secured together that the width of the mold may be adjusted to build different widths of benches. Each mold has its ribs 18 extending throughout its length, with the exception of interruptions, one or more in number, intermediate the ends.

Fig. 8 shows the center portion of the mold with the ribs interrupted along the line which forms the transverse slat 7. The mold is preferably provided at the bottom with a strengthening bar 19, which is riveted or otherwise secured to the mold. Preferably one of such bars is located adjacent to each end of each mold and one in the middle, but the number and location is immaterial. These strengthening bars are preferably made in the same number of pieces as are the molds, so that the width of the latter may be properly adjusted. A suitable number of bolts 20 working through slots in the bars and in the bottom of the mold form a means for clamping the side members of each mold to the center member in any position, so that the width of the mold may be adjusted within certain limits. The sides of the molds extend upward at 21, so as to define the outer face of the sides 8 of the benches. The upper edges of the sides of the molds are best finished by rolling over wire, as shown in Figs. 6 and 7, producing a strengthening of the upper edge of the mold, and doing away with the sharp edge which would otherwise be produced. The ends of the molds are unin-closed.

For the purpose of supporting the molds upon the bents and in proper relation thereto, a frame 22 is employed. This frame is best shown in Figs. 10, 11 and 12. It is preferably formed of angle iron, and comprises longitudinal members 23 and transverse members 24. The longitudinal and transverse members are made of angle iron; the longitudinal members are arranged with their transverse edges uppermost, while the transverse members are arranged with their transverse edges lowermost, the two transverse edges being together. A single rivet at each point of intersection will sufficiently secure the parts together and prevent a loose movement. It also permits the frame to be compactly folded, as shown in Fig. 11.

To the ends of the transverse members 24 are secured brackets 25 for the purpose of giving support to the sides 21 of the mold. These brackets are provided with slots for engagement with bolts 26, so that the width of the transverse members may be adjusted to accommodate the adjustment of the width of the mold.

For the purpose of supporting the frame 22 so as to sustain the mold properly between the bents, I employ boards or planks 27, which are temporarily secured one on each side of a bent, by means of the bolts 28, such bolts passing through openings in the bents. The upper edges of the boards 27 are arranged below the upper faces of the bents, a distance equal to the thickness of the bottom of the mold, so that the top of the mold will be flush with the top of the bent. Brackets 29, similar in many respects to the brackets 25, are adjustably secured in the same manner to the ends of the boards 27, and extend beyond the boards so that their inner faces are separated the same distance as are the brackets 25. The ends of the longitudinal members 23 of the frame 22 are adapted to rest within notches 30, formed in the upper edges of the boards 27. In order to give a firm foundation for the members, the vertical web of each is cut away and bent at right angles, as shown in Fig. 11. This allows the horizontal web to rest upon the base of the notch 30 and the transverse portion formed by bending the vertical web to rest against the face of the board. By this means a firm support for the longitudinal member will be secured and means will be provided for keeping the bents a proper distance apart to resist the strains of the longitudinal wires when the latter are put under tension.

By means of the frame 22 and boards 27, a support for the mold is secured. The bents are arranged a proper distance apart with the boards secured to them; the frames 22 are supported upon the boards and the molds rest upon the frames. There will then be spaces uninclosed at the ends of each bent, and also at the beginning and end of each bench. In order to inclose the ends of the bents additional pieces 31 are temporarily attached between the sides of contiguous molds.

The additional pieces 31 are secured in place by sliding bolts 32 which lie within the rolled over edge of each side 21; slots are formed so that the operating handle of the bolt will extend outward in a position to be manipulated. The bolts extend into the rolled over edge of each additional piece, the strengthening wires not being present in the position occupied by the bolts. The lower portion of each additional piece is supported by means of a bar 33, which is held in place by engagement within notches formed of the vertical inner faces of the brackets 25 and 29.

In order to secure a means for defining the outer side of the end walls a board 34 is attached to the outer face of the outermost bent. This board is attached by the same bolts that the boards 27 are secured to and is similar to said boards, except that it extends upward to the same height as the sides 21 of the mold. The additional pieces 31 over the sides of the end bents of the bench will be secured in the manner described, to the mold on one side, and to the board 34 upon the other. A pin 35 on the board 34 will extend into the rolled over edge of the additional piece, while a strap 36 on the end of the board 34 will form a means of support for the bar 33.

Fig. 6ª shows a means for providing an overhang to the top at the end of the bench. To secure this, the end board 34 is not directly secured to the bent, but the shim 34ª is interposed, which removes the board 34 a sufficient distance to secure the overhang.

By the construction described, a mold for the top and outside of the sides and ends of the bents are formed. For the purpose of defining the inside of the sides, suitable longitudinal boards 37 are arranged within each mold. These longitudinal boards 37 are temporarily secured parallel to the sides 21 of the mold. The lower edge of each board 37 is supported above the bottom of the mold a distance equal to the thickness of the finished top. This support may be made by means of pins 38, which may be permanently secured to the boards 37, and will rest upon the bottom of the mold. Additional support is made by means of the screws 39, which pass through openings in the sides 21, and are temporarily screwed into the boards 37. The space between the sides 21 and the longitudinal boards 37 constitutes a mold for the sides of the bench.

By removing the screws 39 the longitudinal boards 37 can be lifted up, when the bench is molded and the mold is demolished, leaving the holes in the bench which were occupied by the pins 38 and bolts 39. The boards 37 are made in longer lengths than the molds, so that they inclose the sides over the bents.

The inner faces of the ends 3 of each bench are defined by a transverse board 40, which is supported upon the mold in the same manner as the longitudinal boards 37, and is attached to the end boards 34 in the same manner as the boards 37 are attached to the sides 21. They may be lifted out after the mold is demolished in the same manner as the longitudinal boards 37.

In connection with the mold described, means is provided for stretching the longitudinal wires the full length of the bench so that they will be held in proper position and the bents will be held together, permitting the concrete to be introduced. One of the end boards 34 is provided with pins 41, to which the end of the wire is secured. The wires pass through holes in the end board 41 to the adjacent transverse board 40, and extend over the molds and bents between the corrugations of the former to the other end of the bench where they pass through holes in the transverse boards 40 at that end and similar holes in the end board 34, and are set up with winches 42, which are carried by that end board; the wires can now be put under the necessary tension and will be held in proper position. The transverse wires 8, which are preferably heavier than the longitudinal wires are cut to the proper length and bent as shown in Fig. 7 with hooked ends and are placed over the uncorrugated portion of each mold in the position shown in Figs. 7 and 8. The hooked extremities are adapted to rest over and be supported by the uppermost longitudinal wire in each side. The center portion of the transverse wire will rest upon the longitudinal wires and be held in position.

For simplicity of illustration I have shown the reinforcing means as consisting of straight wires, but I prefer to use a twisted wire such as is shown in Fig. 9 for this purpose.

From the foregoing description it will be seen that in building the benches in accordance with my invention, the bents are first arranged in position with the boards 27 bolted thereto. The frames 22 are then arranged between each pair of bents, resting in the notches in the boards 27; the brackets 25 and 28 are then adjusted to the proper position, the molds are adjusted to the proper width, and each one is rested upon a frame between two bents. The additional pieces 31 are then secured in place, and the longitudinal boards 37 are arranged within the molds. The end boards 34 having been previously arranged in position, the longitudinal wires are stretched through the entire length of the bents and put under the necessary tension, the transverse wires are then laid in place and the concrete is poured within the mold and smoothed off to the height of the ribs.

The side and end walls are then molded by pouring in additional material, in the spaces provided for it. When the concrete is sufficiently hardened to permit the removal of the mold the wires where connected to the end boards 34 are first cut so as to permit the removal of the boards. The longitudinal and transverse boards 27 and 40 are removed upward, and the bolts 28 holding the boards 27 are driven out, permitting the boards 27 to drop, and with them the frames 22 and molds 17. The same apparatus may then be used for making additional benches.

In accordance with the provisions of the patent statutes, I have described the principle of my invention, together with the apparatus which I now consider to represent the best embodiment thereof; but I desire to have it understood that the apparatus shown is merely illustrative and that the invention can be carried out in other ways.

Having now described my invention, what I claim and desire to secure by Letters Patent is:

1. An apparatus for molding concrete benches which comprises boards adjustable to both sides of a bent and having notches, a frame resting within the notches and a mold supported by the frame.

2. In an apparatus for molding the top of concrete benches on bents, molds supported upon the bents, the said molds having sides and additional pieces between the molds covering the ends of the bents.

This specification signed and witnessed this sixteenth day of July, 1907.

JOHN WILSON.

Witnesses:
ETTA MAE DENISON,
LEONARD H. DYER.

Copies of this patent may be obtained for five cents each, by addressing the "Commissioner of Patents, Washington, D. C."